United States Patent
Kim et al.

(10) Patent No.: US 10,011,911 B2
(45) Date of Patent: Jul. 3, 2018

(54) HYDROGEN GENERATING UNIT FOR PRODUCING HYDROGEN WATER

(71) Applicant: Solco Biomedical Co., Ltd., Pyungtaek-shi (KR)

(72) Inventors: Seo-Kon Kim, Anyang-shi (KR); Hyun Heo, Suwon-shi (KR); Dong-Soo Lim, Pyungtaek-shi (KR)

(73) Assignee: Solco Biomedical Co., Ltd., Pyungtaek-Shi (KR)

( * ) Notice: Subject to any disclaimer, the term of this patent is extended or adjusted under 35 U.S.C. 154(b) by 0 days.

(21) Appl. No.: 14/810,088

(22) Filed: Jul. 27, 2015

(65) Prior Publication Data

US 2016/0032467 A1 Feb. 4, 2016

(30) Foreign Application Priority Data

Jul. 31, 2014 (KR) .............................. 10-2014-98504

(51) Int. Cl.
| | |
|---|---|
| *C25B 9/08* | (2006.01) |
| *C02F 1/461* | (2006.01) |
| *C25B 11/03* | (2006.01) |
| *C25B 1/10* | (2006.01) |
| *C25B 9/02* | (2006.01) |

(Continued)

(52) U.S. Cl.
CPC ............ *C25B 9/08* (2013.01); *C02F 1/46104* (2013.01); *C25B 1/10* (2013.01); *C25B 9/02* (2013.01); *C25B 11/03* (2013.01); *C02F 1/005* (2013.01); *C02F 1/4676* (2013.01); *C02F 2001/46157* (2013.01); *C02F 2201/46115* (2013.01); *Y02E 60/366* (2013.01)

(58) Field of Classification Search
CPC ..... C25B 1/00; C25B 9/02; C25B 9/08; C02F 1/46104; C02F 1/005; C02F 1/4676; C02F 2001/46157; C02F 2201/46115; Y02E 60/366

See application file for complete search history.

(56) References Cited

FOREIGN PATENT DOCUMENTS

| CN | 102295326 A | * 12/2011 |
|---|---|---|
| KR | 10-2011-39647 | 10/2009 |
| KR | 995713 | 11/2010 |

(Continued)

*Primary Examiner* — Ciel P Thomas
(74) *Attorney, Agent, or Firm* — Greer, Burns & Crain, Ltd.

(57) ABSTRACT

The present invention relates to a hydrogen generating unit for producing hydrogen water, and more particularly, to a hydrogen generating unit which has a structure that is relatively small in volume and simple so as to be easily applied to a small capacity hydrogen water producing apparatus for home or business use, and particularly, in which when an upper electrode and a lower electrode are fastened, an upper cover and a lower cover, which have been used for the hydrogen generating unit in the related art devised by the applicant of the present invention, are not used, but instead, the upper electrode and the lower electrode may be positioned between a cap at the upper side and a housing at the lower side, and the upper electrode and the lower electrode may be assembled together when the cap and the housing are coupled to each other, thereby reducing the number of components used for the hydrogen generating unit, simplifying manufacturing processes, and achieving excellent assembly properties.

4 Claims, 5 Drawing Sheets

(51) Int. Cl.
  *C02F 1/00*    (2006.01)
  *C02F 1/467*   (2006.01)

(56) References Cited

FOREIGN PATENT DOCUMENTS

KR    1076631    10/2011
KR    1250470    3/2013

* cited by examiner

HYDROGEN GENERATING UNIT FOR PRODUCING HYDROGEN WATER

CROSS-REFERENCE TO RELATED APPLICATIONS

This application claims priority under 35 U.S.C. § 119 to Korean Patent Application No. 10-2014-98504, filed on Jul. 31, 2014, in the Korean Intellectual Property Office, the disclosure of which is incorporated herein by reference in its entirety.

BACKGROUND OF THE INVENTION

1. Field of the Invention

The present invention relates to a hydrogen generating unit for producing hydrogen water, and more particularly, to a hydrogen generating unit which has a structure that is relatively small in volume and simple so as to be easily applied to a small capacity hydrogen water producing apparatus for home or business use. In particular, when an upper electrode and a lower electrode are fastened, an upper cover and a lower cover, which have been used for the hydrogen generating unit in the related art devised by the applicant of the present invention, are not used, but instead, the upper electrode and the lower electrode may be positioned between a cap at the upper side and a housing at the lower side, and the upper electrode and the lower electrode may be assembled together when the cap and the housing are coupled to each other, thereby reducing the number of components used for the hydrogen generating unit, simplifying manufacturing processes, and achieving excellent assembly properties.

2. Description of the Related Art

In general, hydrogen water refers to water in which a large amount of hydrogen is dissolved.

It has been reported that the hydrogen dissolved in the hydrogen water performs an anti-oxidant action that removes hydroxyl radicals that is active oxygen, assists in preventing aging, diabetes mellitus, hypertension, atherosclerosis, cancer, and dementia, and is effective in assisting skin care, diet, and fatigue recovery, improving sexual function, and exercise capacity, enhancing immunity, and relieving hangover.

As apparatuses capable of producing the hydrogen water in the publicly known technologies in the related art, Korean Patent Application Laid-Open No. 10-2011-39647 discloses a generation device of electrolysis hydrogen water, Korean Patent No. 1076631 discloses a hydrogen water producing apparatus, Korean Patent No. 995713 discloses an electrode assembly for electrolysis, an oxygen and hydrogen generator including the same, and a hydrogen water producing apparatus including the same, and Korean Patent No. 1250470 discloses a dissolved hydrogen water producing apparatus.

However, according to the hydrogen water producing apparatus, since a volume of a part of the hydrogen generating unit, which is a key part for producing hydrogen water, is large, and a structure thereof is complicated, such that the hydrogen water producing apparatus is difficult to be applied to a relatively small capacity hydrogen water producing apparatus for home or business use.

Therefore, the applicant of the present invention has developed a small-sized compact hydrogen generating unit having a structure that is small in volume and simple, and has filed a patent application for the invention as Korean Patent Application No. 10-2014-13285.

The earlier application filed by the applicant of the present invention has a configuration that includes a diaphragm, an upper electrode and a lower electrode which are positioned at upper and lower sides of the diaphragm, in which an upper cover is fastened to an upper side of the upper electrode, a lower cover is fastened to a lower side of the lower electrode, a plurality of coupling holes is formed in the upper electrode and the lower electrode so that the upper electrode and the lower electrode are coupled to the upper cover and the lower cover, and coupling holes are also formed in the upper cover and the lower cover. However, when the upper and lower electrodes and the upper and lower covers are coupled, the coupling holes are aligned and fastened by bolts or the like, and as a result, there are problems in that an additional process forming the coupling holes is required, and there is inconvenience in performing a process of assembling the unit.

SUMMARY OF THE INVENTION

The present invention has been made in an effort to provide a hydrogen generating unit for producing hydrogen water, which may have a structure that is small in volume and simple, may be applied to a small capacity hydrogen water producing apparatus, may simplify manufacturing processes because it is not necessary to couple an electrode to a cover, and may have excellent assembly properties.

The present invention has also been made in an effort to provide a hydrogen generating unit, which uses a small-sized power source so that the hydrogen generating unit is easily installed into a small capacity hydrogen water producing apparatus, in which the size and the number of pores are determined to maximize production yields of an upper electrode and a lower electrode of the hydrogen generating unit.

An exemplary embodiment of the present invention provides a hydrogen generating unit for producing hydrogen water, including: a housing; and a cap which is coupled to an upper portion of the housing and has a joint pipe formed downward, in which the housing includes a head at the upper side thereof, and a connecting pipe that protrudes downward from the head, a catching projection is formed between an insertion hole in the head and the connecting pipe, an upper electrode and a lower electrode are coupled between a lower portion of the joint pipe of the cap and the catching projection of the head when the joint pipe of the cap is inserted into the insertion hole of the head, and a diaphragm is interposed between the upper electrode and the lower electrode.

The hydrogen generating unit for producing hydrogen water according to the present invention, which has the aforementioned configuration, has a structure that is small in volume and simple, such that the hydrogen generating unit may be easily applied to a small capacity hydrogen water producing apparatus for home or business use.

Since it is not necessary to fasten a separate upper cover and a separate lower cover to upper and lower portions of the electrode, the number of components for use may be reduced, a process of manufacturing the hydrogen generating unit may be simplified, and assembly properties may be improved, thereby improving productivity of the hydrogen generating unit of the present invention.

The size and the number of pores of the hydrogen generating unit of the present invention may reduce a volume of a power source installed into a hydrogen water producing apparatus, and may maximize production yields of the upper electrode and the lower electrode of the unit.

Furthermore, a hydrogen water producing apparatus having the hydrogen generating unit of the present invention is a very advanced invention that may produce high-quality hydrogen water in which plentiful amounts of hydrogen useful for human bodies are dissolved.

DETAILED DESCRIPTION OF THE EMBODIMENTS

Hereinafter, a configuration and an operation of a hydrogen generating unit for producing hydrogen water of the present invention will be described with reference to the drawings.

However, the disclosed drawings are provided as an example for fully transferring the spirit of the present invention to those skilled in the art. Therefore, the present invention is not limited to the drawings disclosed below, and may be specified as other aspects.

Unless there are other definitions, the terminologies used in the specification of the present invention have the meanings that those having ordinary skill in the technical field to which the present invention pertains typically understand, and in the following description and the accompanying drawings, a detailed description of publicly known functions and configurations will be omitted so as to avoid unnecessarily obscuring the subject matter of the present invention.

Figure 1:
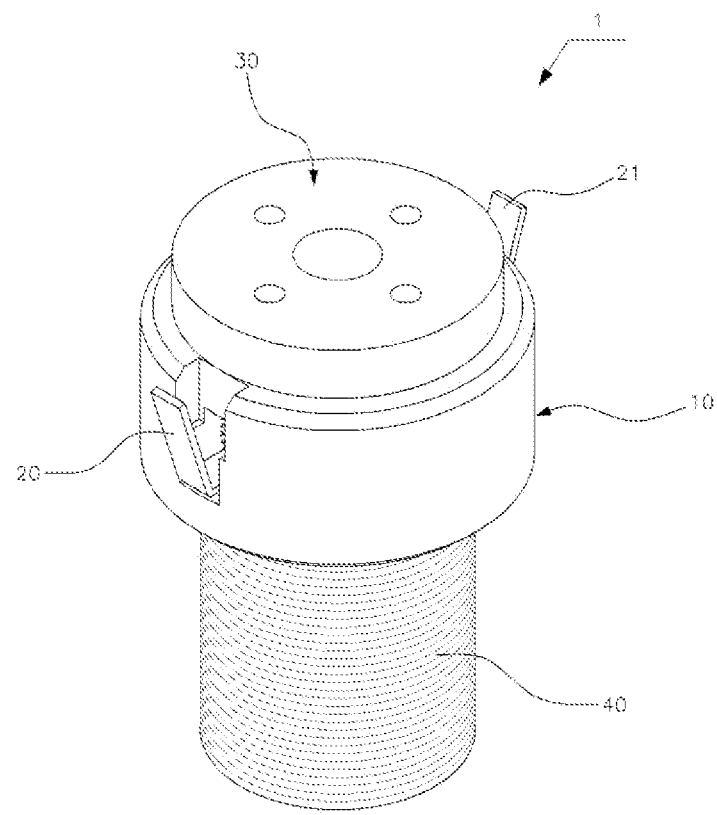
FIG. 1 is a perspective view of a hydrogen generating unit of the present invention.
Figure 2:
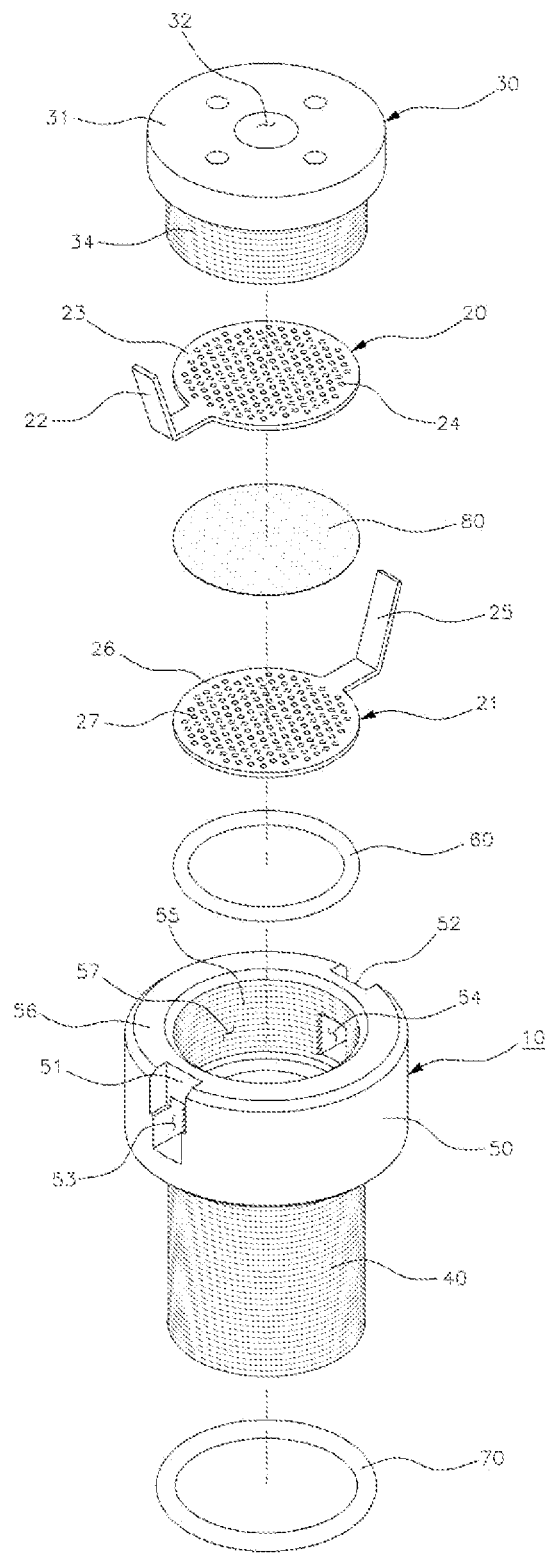
FIG. 2 is an exploded perspective view of the hydrogen generating unit of the present invention.
Figure 3:
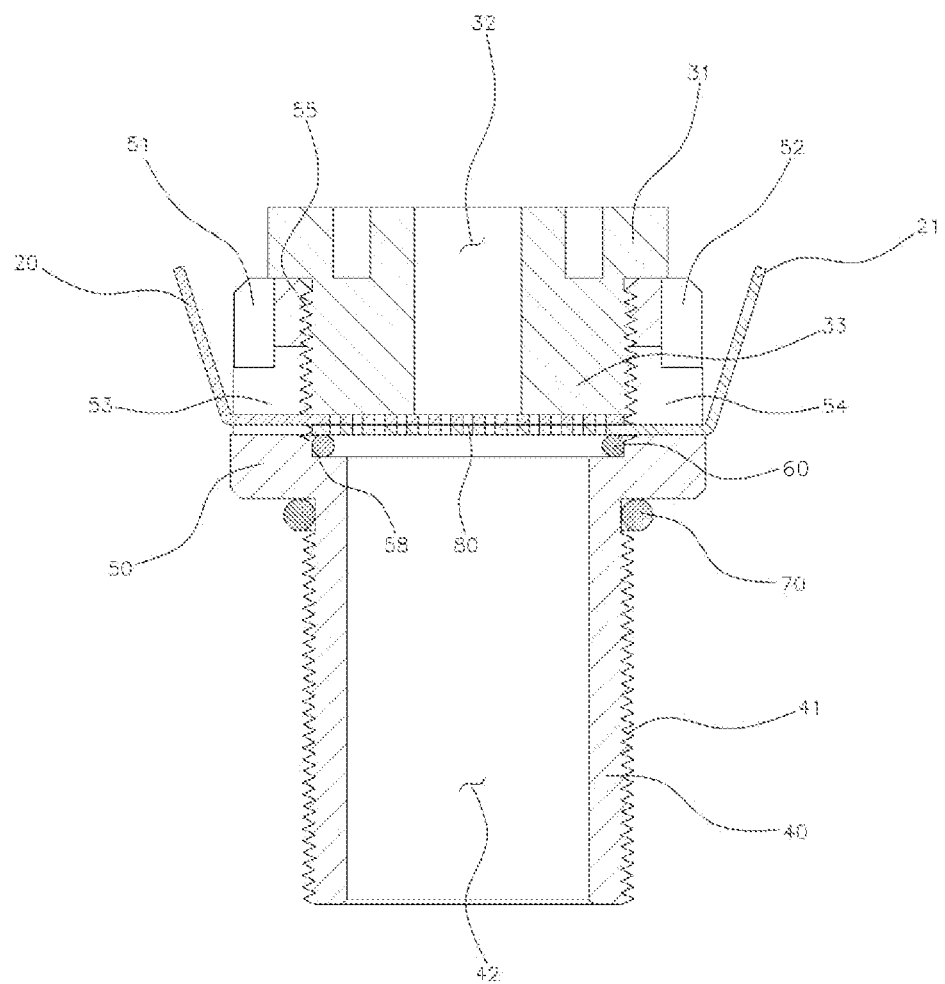
FIG. 3 is a cross-sectional view of the hydrogen generating unit of the present invention.

FIG. 1 is a perspective view of a hydrogen generating unit of the present invention, FIG. 2 is an exploded perspective view of the hydrogen generating unit of the present invention, and FIG. 3 is a cross-sectional view of the hydrogen generating unit of the present invention.

A hydrogen generating unit 1 (hereinafter, referred to as 'unit' for ease of description) for producing hydrogen water according to the present invention has a structure that is relatively small in volume and simple so as to be easily applied to a small capacity hydrogen water producing apparatus for home or business use. In particular, when an upper electrode and a lower electrode are fastened, an upper cover and a lower cover, which have been used for the hydrogen generating unit in the related art devised by the applicant of the present invention, are not used, but instead, the upper electrode and the lower electrode may be positioned between a cap 30 at the upper side and a housing 10 at the lower side, and the upper electrode and the lower electrode may be assembled together when the cap 30 and the housing 10 are coupled to each other, thereby reducing the number of components used for the hydrogen generating unit, simplifying manufacturing processes, and achieving excellent assembly properties.

Referring to FIGS. 1 to 3, the unit 1 of the present invention includes an upper electrode 20 and a lower electrode 21 to which electric power for producing hydrogen is applied, a housing 10 to which a diaphragm 80 is coupled, and a cap 30 which is coupled to an upper portion of the housing 10.

The cap 30 includes a circular flange 31 which has a passing hole 32 formed at a center of the cap 30, and a cylindrical joint pipe 33 which protrudes downward from the flange 31, and screw threads 34 which are formed on an outer surface of the joint pipe 33.

The housing 10 includes a cylindrical head 50 which is formed at an upper side of the housing 10, and a cylindrical connecting pipe 40 which protrudes downward from the head 50.

Screw threads 41 are formed on an outer surface of the connecting pipe 40 so that the connecting pipe 40 may be easily coupled to an outlet (not illustrated) or a connecting pipe (not illustrated) through which water is discharged from a water tub to which the unit 1 of the present invention is assembled, and a hollow connecting hole 42 is formed in the connecting pipe 40.

An external O-ring 70 is installed between an outer circumferential surface of an uppermost portion of the connecting pipe 40 and a bottom surface at a lower end of the head 50 in order to prevent water from leaking between the water tub and the head 50 when the connecting pipe 40 is coupled to the water tub and the like.

Recessed surfaces 51 and 52, which are recessed downward from an upper surface 56 of the head 50, are formed in an outer circumferential surface of the head 50, and through holes 53 and 54, which penetrate the outer circumferential surface of the head 50 from a space of an insertion hole 57 in the head 50, are formed at lower sides of the recessed surfaces 51 and 52, respectively.

A horizontal catching projection 58 is formed between the insertion hole 57 of the head 50 and the connecting pipe 40, and an internal O-ring 60 for preventing a water leak is installed on the catching projection 58.

Here, screw threads 55 are formed on an inner wall surface of the head 50, and the screw threads 34 are also formed on the outer surface of the joint pipe 33 of the cap 30, such that the joint pipe 33 of the cap 30 is inserted into the insertion hole 57 of the head 50, and the screw threads 34 of the cap 30 and the screw threads 55 of the head 50 are coupled to each other while engaging with each other.

When the cap 30 and the head 50 are coupled to each other as described above, the upper electrode 20 and the lower electrode 21 are coupled together between a lower portion of the joint pipe 33 of the cap 30 and an upper portion of the internal O-ring 60 mounted on the catching projection 58 of the head 50.

In this case, the diaphragm 80 is interposed between the upper electrode 20 and the lower electrode 21.

Next, an electrode terminal 22 of the upper electrode 20 and an electrode terminal 25 of the lower electrode 21 are exposed to the outside of the head 50 through the through holes 53 and 54 of the head 50, respectively, such that electric power is easily applied through the electrode terminals 22 and 25.

The upper electrode 20 and the lower electrode 21 have flat circular plates 23 and 26, respectively, a plurality of pores 24 and 27 is formed at central portions of the plates 23 and 26 at small intervals, respectively, and the electrode terminals 22 and 25 to which electric power is applied protrude at one side of an outer circumference of each of the plates 23 and 26.

A positive voltage or a negative voltage is applied to each of the electrode terminals 22 and 25 of the upper electrode 20 and the lower electrode 21, thereby electrolyzing water accommodated in a water reservoir (e.g., a water tub such as a first water tub 100 in FIG. 5) to which the unit 1 of the present invention is installed, and producing hydrogen.

The upper electrode 20 and the lower electrode 21 are a kind of catalyst electrode that allows hydrogen to easily diffuse and has high permissible current density, and may be made of a precious metallic material such as platinum or iridium.

In the exemplary embodiment of the present invention, a positive electrode is formed as the upper electrode 20 by using an iridium electrode, and a negative electrode is formed as the lower electrode 21 by using a platinum electrode. However, based on a position of the water tub of an apparatus in use, a negative electrode may be formed as the upper electrode 20 by using a platinum electrode, and a positive electrode may be formed as the lower electrode 21 by using an iridium electrode.

The diaphragm 80 is a polymeric membrane made of a silicone material and serves to allow hydrogen ions, which are ionized and decomposed by the upper electrode 20 and the lower electrode 21, to pass therethrough, but also serves to block water from passing therethrough.

Therefore, in a case in which the upper electrode 20 forms a positive electrode and the lower electrode 21 forms a negative electrode in a case in which the cap 30 is coupled to the head 50 of the housing 10, oxygen, which is generated at the upper electrode 20, that is, the positive electrode, moves upward through the passing hole 32 of the cap 30 onto the water surface in the water reservoir to which the unit 1 of the present invention is attached, and then is discharged to the outside, and hydrogen, which is generated at the lower electrode 21, that is, the negative electrode, is dissolved in water, which is supplied through the connecting hole 42 of the connecting pipe 40 from the other water tub (e.g., a water tub such as a second water tub 200 in FIG. 5), thereby producing hydrogen water.

In contrast, in a case in which the upper electrode forms a negative electrode and the lower electrode 21 forms a positive electrode when the cap 30 is coupled to the head 50 of the housing 10, oxygen, which is generated at the lower electrode 21, that is, the positive electrode, moves upward through the connecting hole 42 of the connecting pipe 40 onto the water surface in the water reservoir, and then is discharged to the outside, and hydrogen, which is generated at the upper electrode 20, that is, the negative electrode, is dissolved in water, which is supplied through the passing hole 32 of the penetrating cap 30 from the other water tub (e.g., a water tub such as the second water tub 200 in FIG. 5), thereby producing hydrogen water.

Therefore, since the direction in which hydrogen is generated may be changed in accordance with the type of voltage applied to the upper electrode 20 and the lower electrode 21, the unit 1 of the present invention may be widely applied to more various apparatuses.

Meanwhile, the voltage applied to the upper electrode 20 and the lower electrode 21 may be supplied from a small-sized power source so that the unit 1 may be easily installed into a small capacity hydrogen water producing apparatus.

Furthermore, the upper electrode 20 and the lower electrode 21 may have the size and the number of pores processed to maximize a production yield.

Figure 4:
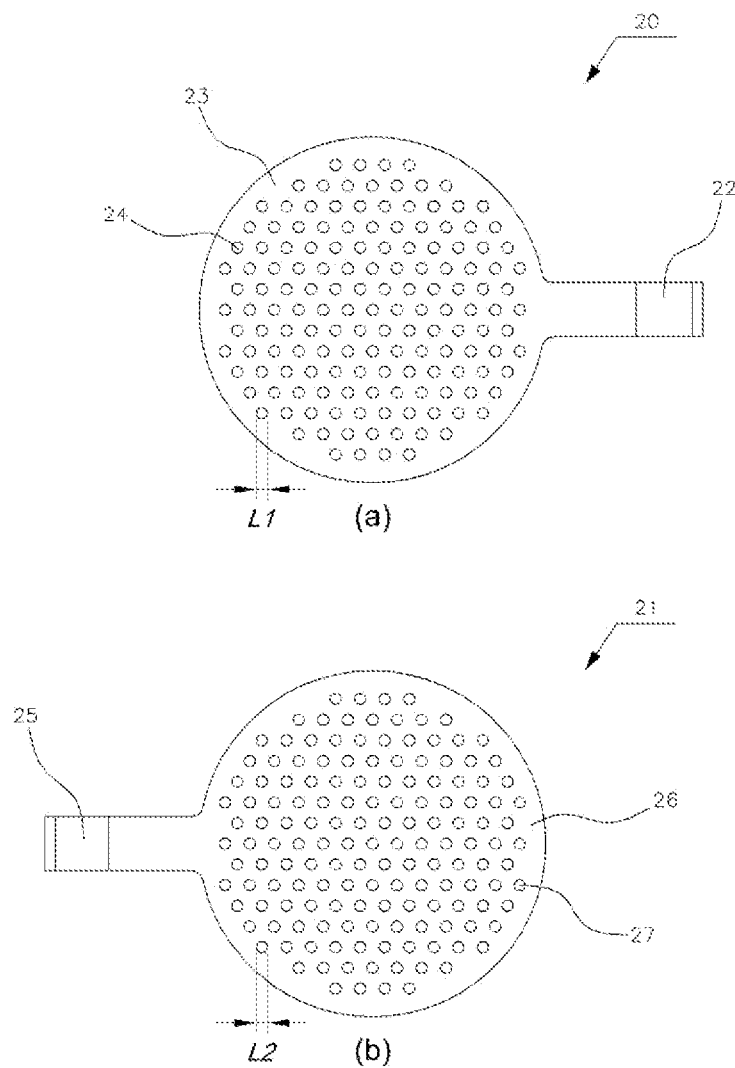
FIG. 4 is a top plan view of an upper electrode and a lower electrode of the hydrogen generating unit of the present invention.

Therefore, the upper electrode 20 and the lower electrode 21 of the present invention are processed to have the pores with the size and the number as illustrated in a top plan view of the following FIG. 4, in consideration of the small-sized power source and the production yield as described above.

First, a top plan view of FIG. 4A at the upper side of FIG. 4 illustrates the upper electrode 20, and a top plan view of FIG. 4B at the lower side of FIG. 4 illustrates the lower electrode 21. A diameter L1 of the pores 24 and 27 of the upper electrode 20 and the lower electrode 21 may be 0.8$\varphi$ (mm), and the number of pores 24 and 27 may be 217.

The diameter L1 of the pores 24 and 27 of the upper electrode 20 and the lower electrode 21 may be 1.0 $\varphi$ (mm), and the number of pores 24 and 27 may be 157.

The diameter L1 of the pores 24 and 27 of the upper electrode 20 and the lower electrode 21 may be 1.0 $\varphi$ (mm), and the number of pores 24 and 27 may be 141.

The diameter L1 of the pores 24 and 27 of the upper electrode 20 and the lower electrode 21 may be 1.0 $\varphi$ (mm), and the number of pores 24 and 27 may be 171.

The diameter L1 of the pores 24 and 27 of the upper electrode 20 and the lower electrode 21 may be 1.2 $\varphi$ (mm), and the number of pores 24 and 27 may be 109.

That is, as illustrated in the drawings, the diameter of the pore 24 or 27 of the upper electrode 20 or the lower electrode 21 of the unit 1 of the present invention is 0.8 $\varphi$ (mm) to 1.2 $\varphi$ (mm), and the number of pore 24 or 27 is 109 to 217, thereby satisfying a condition for using an output voltage from the small-sized power source so that the unit 1 may be easily installed into a small capacity hydrogen water producing apparatus, and a condition for maximizing production yields of the upper electrode and the lower electrode of the unit.

The small-sized power source, which may be applied to the present invention, may provide an output voltage of 4 V and an output current of 3 A. If the output voltage exceeds 4 V and the output current exceeds 3 A, a size of the power source itself is increased, and as a result, it is difficult to install the unit to a small-sized hydrogen water producing apparatus.

Thus, the diameter of the pores 24 and 27 of the upper electrode 20 and the lower electrode 21 is 0.8 $\varphi$ (mm) to 1.2 $\varphi$ (mm), and the number of pores 24 and 27 is 109 to 217, such that the unit 1 of the present invention may produce hydrogen water with a maximum amount of dissolved hydrogen by using the output voltage of 4 V and the output current of 3 A that are the maximum permissible values of the small-sized power source.

Furthermore, with the aforementioned diameter and number of pores 24 and 27 of the upper electrode 20 and the lower electrode 21 of the unit 1 of the present invention, production yields of the upper electrode 20 and the lower electrode 21 may be maximized.

This is because if the diameter range of the pores is smaller than the aforementioned diameter range, an inferiority rate is increased during a process of forming the pores in the upper electrode 20 and the lower electrode 21, and if the diameter range of the pores is greater than the aforementioned diameter range, the number of pores per unit area is decreased, such that it is impossible to produce hydrogen water with a desired amount of dissolved hydrogen.

Figure 5:
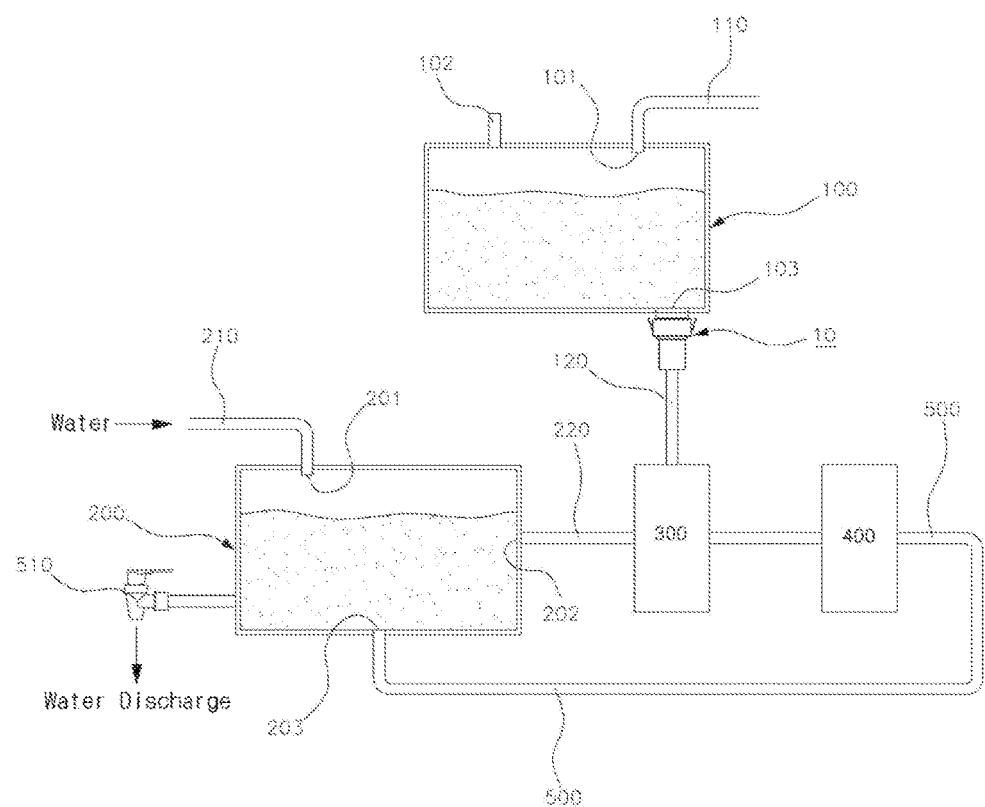
FIG. 5 is a configuration diagram of an example in which the hydrogen generating unit of the present invention is applied to a hydrogen water producing apparatus.

FIG. 5 is a configuration diagram of an example in which the hydrogen generating unit 1 of the present invention is applied to a hydrogen water producing apparatus. FIG. 5 illustrates a configuration of an example of the hydrogen producing apparatus using the unit 1 that uses the upper electrode 20 and the lower electrode 21 in which the diameter of the pores 24 or 27 is 0.8 $\varphi$ (mm) to 1.2 $\varphi$ (mm), and the number of pores 24 or 27 is 109 to 217.

Referring to the drawings, the hydrogen water producing apparatus includes the first water tub 100 which is supplied with water, which is purified by a typical filter member (not illustrated), through a water inlet port 101 via a water supply pipe 110 and stores water, the unit 1 of the present invention which is connected and attached to a water outlet port 103 at a lower side of the first water tub 100 and electrolyzes water accommodated in the first water tub 100 to produce hydrogen, the second water tub 200 which is supplied with water, which is purified by a typical filter member (not illustrated), through a water inlet port 201 via a water supply pipe 210 and stores water, and discharges water to a pump 300 through a water outlet port 202 and a drain pipe 220, the pump 300 which pumps hydrogen produced by the unit 1 and water accommodated in the second water tub 200 to a dissolving apparatus 400 installed at the rear end thereof, and the dissolving apparatus 400 which produces high-concentration hydrogen water by mixing water in the second water tub 200, which is pumped by the pump 300, with hydrogen produced by the unit 1. In this case, the high-concentration hydrogen water, which is produced by the dissolving apparatus 400, returns to the second water tub 200 through a recovery port 203 of the second water tub 200 via a discharge pipe 500, and then is discharged to the outside through a discharge port 510 attached to the second water tub 200, such that a user drinks the hydrogen water.

Oxygen, which is produced at the upper electrode 20 of the unit 1, moves upward onto the water surface in the first water tub 100 to which the unit 1 is attached, and then is discharged to the outside through an air vent 102, and hydrogen, which is produced at the lower electrode 21, that is, the negative electrode, is dissolved in water supplied from the second water tub 200 through a water discharge pipe 120, thereby producing hydrogen water.

The dissolving apparatus 400 is a member which has a hollow fiber membrane filter mounted therein, and hydrogen produced by the unit 1 and water accommodated in the second water tub 200 are pumped and flown into the dissolving apparatus 400 when the pump 300 is operated, foreign substances are filtered while the water passes through the hollow fiber membrane filter mounted in the dissolving apparatus 400, and hydrogen is uniformly and plentifully mixed with the water flowing into the dissolving apparatus 400 which create minute bubbles, thereby producing high-concentration hydrogen water.

The hydrogen water producing apparatus of the exemplary embodiment, which adopts the unit 1 of the present invention as described above, is operated first for one hour after applying a voltage of 4 V and a current of 3 A to the unit 1 as described above, and stopped for 40 minutes, and then operated for 20 minutes, and thereafter, stopped for 40 minutes, in a continuous manner, thereby producing high-concentration hydrogen water of about 1,000 ppm to 1,300 ppm.

What is claimed is:

1. A hydrogen generating unit for producing hydrogen water, consisting essentially of:
   a housing (10) including a cylindrical head comprising an insertion hole, the head being formed at an upper side of the housing, screw threads being formed on an inner wall surface of the head, and a cylindrical connecting pipe which protrudes downward from the head, the connecting pipe being connectable with an outlet through which water is discharged when the hydrogen generating unit is assembled with a water tub; and
   a cap including a circular flange which has a passing hole formed at a center of the cap, and a cylindrical joint pipe which protrudes downward from the flange, and screw threads being formed on an outer surface of the joint pipe,
   the joint pipe of the cap being inserted into the insertion hole of the head and the screw threads of the cap and the screw threads of the head being coupled to each other while engaging with each other,
   a catching projection is formed between an insertion hole in the head and the connecting pipe, an upper electrode and a lower electrode are coupled between a lower portion of the joint pipe of the cap and the catching projection of the head when the joint pipe of the cap is inserted into the insertion hole of the head, and a diaphragm (80) is interposed between the upper electrode and the lower electrode;
   wherein recessed surfaces, which are recessed downward from an upper surface of the head, are formed in an outer circumferential surface of the head, through holes, which penetrate the outer circumferential surface of the head from a space of the insertion hole in the head, are formed at lower sides of the recessed surfaces, and an electrode terminal of the upper electrode and an electrode terminal of the lower electrode are exposed to the outside of the head through the through holes of the head;
   wherein the upper electrode and the lower electrode have flat circular plates, and a plurality of pores is formed at central portions of the plates at intervals;
   wherein an internal O-ring for preventing a water leak is installed on the catching projection.

2. The hydrogen generating unit of claim 1, wherein in the upper electrode or the lower electrode, a diameter of the pores is 0.8 mm to 1.2 mm, and the number of pores is 109 to 217.

3. The hydrogen generating unit of claim 1, wherein the unit is a personal use unit.

4. The hydrogen generating unit of claim 1, wherein the upper electrode, the diaphragm and the lower electrode are held in place with the joint pipe of the cap, thereby reducing the number of components used in the hydrogen generating unit.

* * * * *